Dec. 19, 1922.
G. A. SAFSTROM
TIRE TOOL.
FILED APR. 19, 1920.
1,439,381
2 SHEETS-SHEET 1
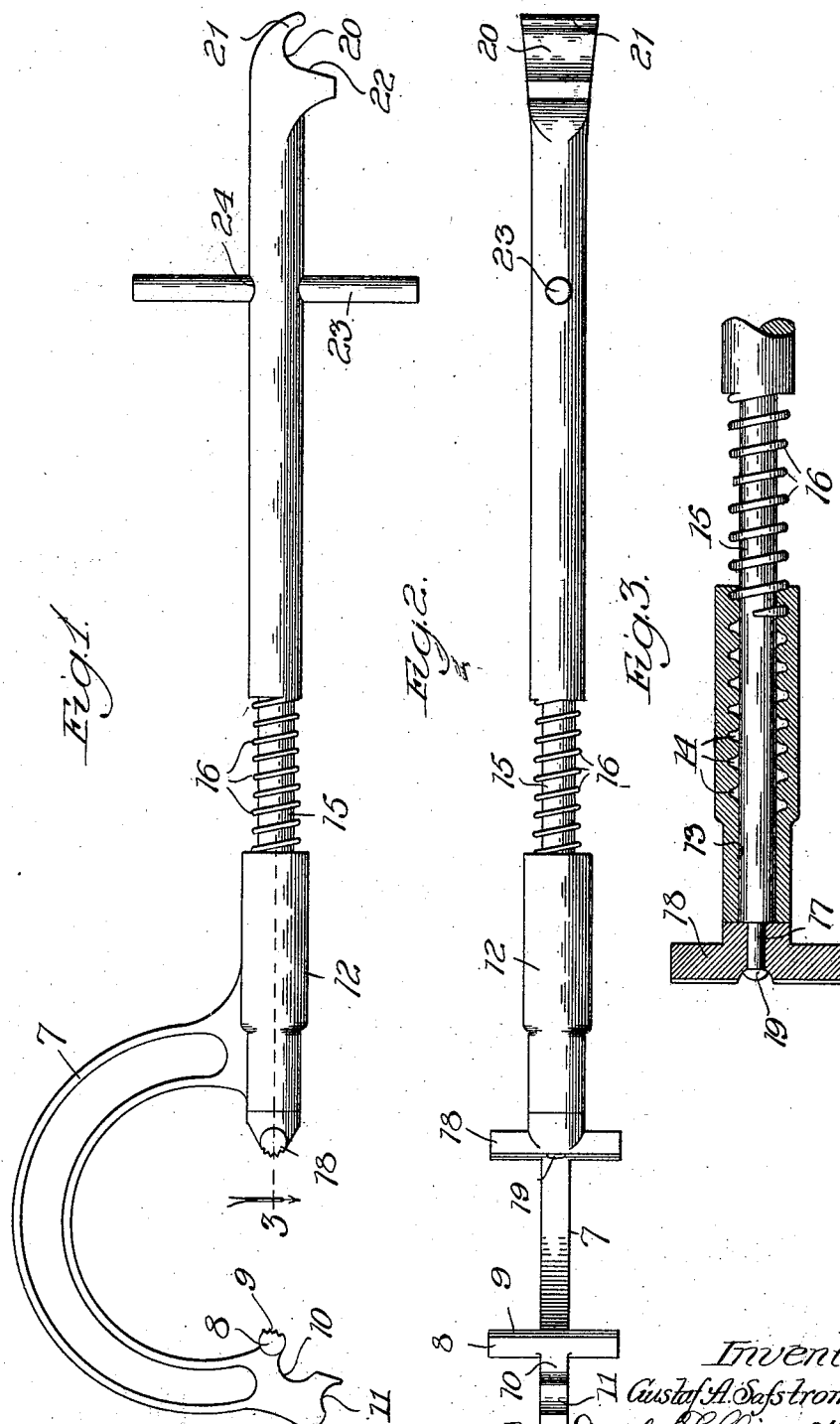
Inventor,
Gustaf A. Safstrom,
By Dyrenforth, Lee, Chritton & Wiles
Att'ys

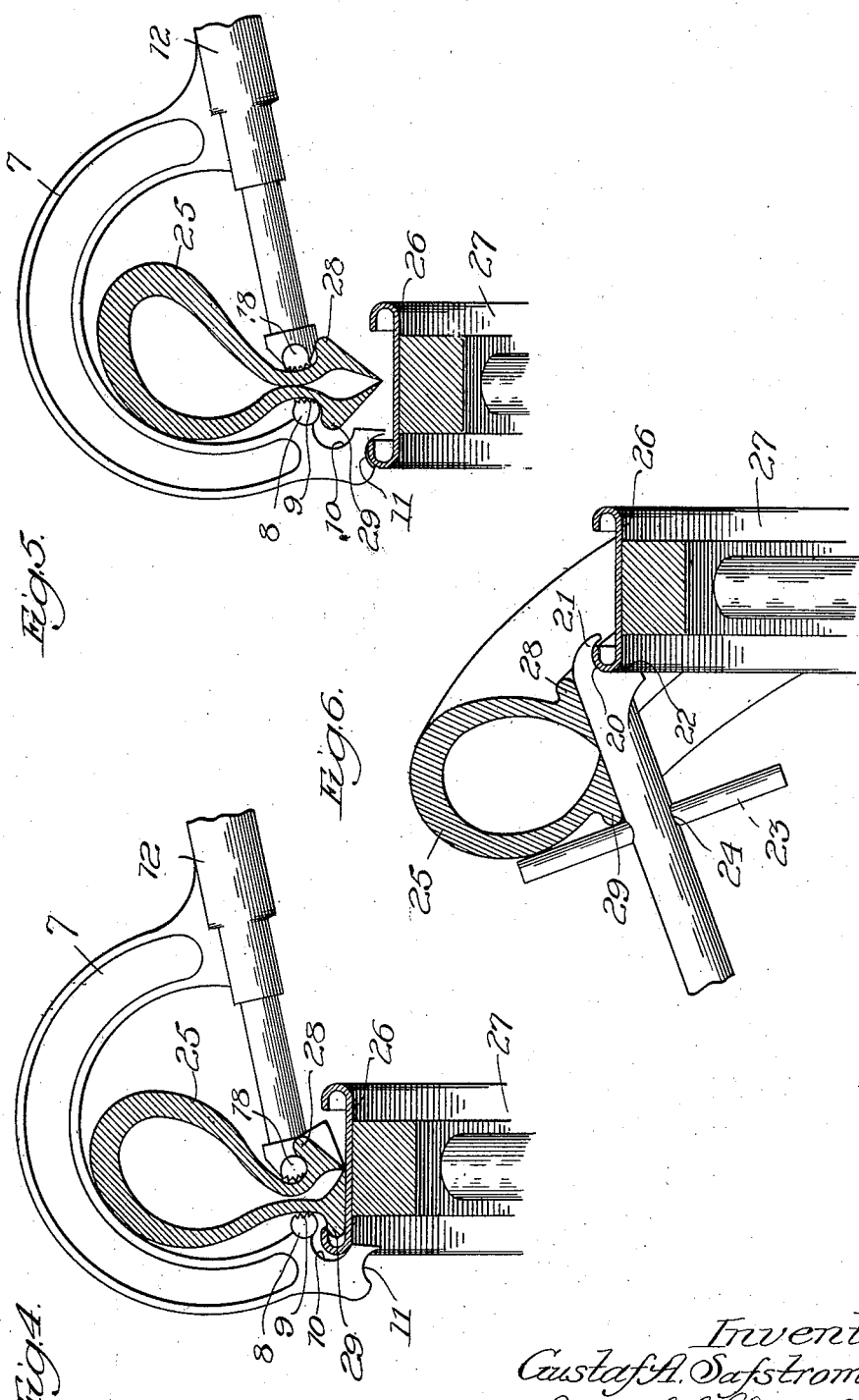

Patented Dec. 19, 1922.

1,439,381

UNITED STATES PATENT OFFICE.

GUSTAF A. SAFSTROM, OF CHICAGO, ILLINOIS.

TIRE TOOL.

Application filed April 19, 1920. Serial No. 374,947.

*To all whom it may concern:*

Be it known that I, GUSTAF A. SAFSTROM, a citizen of the United States, residing at 1516 E. 64th Street, Chicago, in the county of Cook and State of Illinois, have invented a new and useful Improvement in Tire Tools, of which the following is a specification.

My invention relates to tire tools for use in the manipulating of tires of a type requiring that the sides thereof be forced together for applying, or removing them, from the rim of a wheel, as for example in the case of clincher tires involving beads along their opposite edges and for the manipulation of which my invention was more particularly devised, my invention in its preferred embodiment providing means whereby a tire of the character above stated may be removed from a rim and also means whereby it may be applied to a rim.

My primary object, generally stated, is to provide a novel, simple and inexpensive construction of tire tool by which a tire of the type stated may be quickly removed from a rim, without danger of impairing the tire, and which will operate positively, and prevent slippage; another object is to provide a tire tool whereby a tire of the type stated may be readily replaced on a rim without danger of impairing the tire; another object is to provide in a single tool for the accomplishment of both of the purposes above stated; and other objects as will be understood from the following:

Referring to the accompanying drawings:

Figure 1 is a view in side elevation of a tire tool constructed in accordance with my invention. Figure 2 is an edge view of the same. Figure 3 is an enlarged section taken at the line 3 on Fig. 1 and view in the direction of the arrow. Figure 4 is a broken cross-sectional view of a rim and tire of the clincher type showing my improved tool applied thereto for removing the tire, the parts being shown in one of the positions they assume during such operation. Figure 5 is a similar view showing the parts in another position during the operation of removing the tire from the wheel; and Figure 6, a similar view showing the use of the tool for applying a tire to the rim.

In accordance with the particular, illustrated, embodiment of my invention, I form the tool of a head-forming member 7 which is preferably of curve shape as shown adapting it to be applied to a tire on a rim, to straddle the tire. One end of the member 7, at its inner side is provided with a portion 8 which extends transversely of the tool for engaging one side of a tire to which the tool is applied, the surface of the portion 8 at which it engages the tire being preferably serrated as indicated at 9, and widened out to extend laterally beyond the body of the member 7 in both directions as indicated in Fig. 2. The inner side of the member 7 beyond the portion 8 is recessed as indicated at 10 to prevent interference by the edge of the rim of the wheel, in the operation of removing a tire, and its bottom surface is recessed as indicated at 11 to engage the rim flange during one stage of the operation of removing a tire. The other extremity of the member 7, which is formed with a tubular extension 12, has an opening 13 extending therethrough, the wall of which, throughout a portion of its length, is internally screw-threaded as indicated at 14, this thread being preferably located in the extension 12. The described apertured portion of the member 7 affords a supporting bearing for a rod 15 which is rotatable in this extension, this rod being provided throughout a portion of its length with a screw-thread 16 adapted to screw into the thread 14 whereby in the rotation of the rod 15 the latter moves lengthwise in the member 7 in a direction depending upon the rotation of this rod. The inner end of the rod 15 is of reduced diameter as represented at 17 forming a pivot for a tire-engaging element 18 similar to the tire-engaging portion 8 as shown and which opposes the latter, substantially in a line with the rod 15, the outer end of the portion 17 being shouldered, as indicated at 19, to prevent disengagement of the element 18 from the rod, but permitting rotation of the rod relative to this element. The other end of the rod 15, which forms an operating handle for the tool, is so formed as to present means for assembling a tire with a rim, and to this end the rod 15 is recessed as indicated at 20 to provide a claw 21 adjacent to which is a stop surface 22 for a purpose hereinafter described, the rod 15 intermediate the threaded part 16 and the claw 21 being equipped with a bar 23 extending transversely of the rod and serving as a means for turning the rod 15 and also as a stop for the tire in the operation of assembling the tire with the rim, the bar 23 extending through an opening 24 in the rod 15.

To use the tool for removing a tire from a rim, as for example the tire represented at 25, from the rim 26 of a wheel 27, the operator applies the tool to the tire to cause the member 7 to straddle the tire and extend transversely thereof the bead of the rim 26 at one side of the wheel extending into the recess 10 as shown in Fig. 4. In this position of the tool the tire-engaging portions 8 and 18 extend above the rim flanges. The operator then rotates the rod 15 in clockwise direction in the member 7 which shifts this rod, and the tire-engaging portion 18 carried thereby, toward the tire-engaging portion 8, the operator turning the rod through the medium of the cross piece 23, and continuing to turn the rod until the parts of the tool assume generally the position shown in Fig. 4 wherein the tire is collapsed as shown and the tire bead, represented at 28, at one side of the tire is forced inwardly out of engagement with the adjacent rim flange, at the point where the tool is clamping the tire and for some distance at opposite sides thereof. The operator then swings the tool downwardly at its handle-equipped end, the bar portion 15 contacting with the adjacent flange of the rim and operating as a fulcrum, in the continued downward swinging of the tool. In this movement of the tool the extremity thereof containing the recesses 10 and 11 is caused to swing upwardly to a position in which it engages the adjacent rim-flange, the other bead represented at 29, of the tire, drawing out of interlocking relation with the adjacent rim flange, at a point adjacent to the tire-engaging portion 8 and for some distance at each side thereof, the recessed portion 11 of the tool in this operation becoming positioned directly above the adjacent rim flange. The operator then swings the tool in the opposite direction, the member 7 becoming seated at its recess 11 on the adjacent rim flange as shown in Fig. 5, and forming a fulcrum for the tool, the operator continuing to swing the tool on this fulcrum, to the left in Figs. 4 and 5 to the desired extent for pulling the tire out of engagement with the rim flanges, if necessary the operator swinging the tool throughout 260°, or more, from the position shown in Figs. 4 and 5.

In the use of the tool for applying a tire to a rim, the operator first applies the tire to the rim as far as possible by hand, and then introduces the end of the tool provided with the claw 21, under the portion of the tire not engaged with the rim, to cause the claw 21 to interlock with the adjacent rim flange as shown in Fig. 6. The operator then swings the tool upwardly to the right in Fig. 6 with the result of forcing the tire into final position on the rim 26. In this operation the rod 23 forms a stop for the tire, preventing its displacement on the tool in the wrong direction. The shoulder 22 serves the highly useful purpose of preventing the tool from slipping toward the center of the rim and into such position that the claw might damage the tire.

While I have illustrated and described a particular construction of tire tool embodying my invention, I do not wish to be understood as intending to limit it thereto as the same may be variously modified and altered without departing from the spirit of my invention, it being my intention to claim my invention as fully and completely as the prior state of the art will permit.

What I claim as new and desire to secure by Letters Patent is:

1. A tire-tool formed of a handle portion, means at one end of said handle portion for gripping a tire from opposite sides thereof to collapse the tire, means at the opposite end of said handle portion for prying a tire into place on a rim, and a cross-piece on said handle-portion serving as a means for operating said first-named means and as a stop for the tire in the application of the latter to a rim.

2. A tire-tool formed of a handle portion, a member with which said handle portion has threaded engagement, tire-engaging portions for engaging the opposite sides of a tire, respectively, one of said portions being on said member and the other of said portions being movable by rotating said handle, means at the opposite end of said handle portion for prying a tire into place on a rim, and a cross-piece on said handle portion serving as a means for rotating the latter and also as a stop for the tire.

GUSTAF A. SAFSTROM.